United States Patent
Prasad et al.

(10) Patent No.: US 11,455,161 B2
(45) Date of Patent: Sep. 27, 2022

(54) UTILIZING MACHINE LEARNING MODELS FOR AUTOMATED SOFTWARE CODE MODIFICATION

(71) Applicant: Accenture Global Solutions Limited, Dublin (IE)

(72) Inventors: Rajendra Tanniru Prasad, Basking Ridge, NJ (US); Aditi Kulkarni, Bengaluru (IN); Koushik M. Vijayaraghavan, Chennai (IN); Priya Athreyee, Chennai (IN); Pradeep Senapati, Bangalore (IN); Kamakshi Girish, Bangalore (IN); Dibyendu Chattopadhyay, North Parganas (IN); Nivedita Shah, Pune (IN)

(73) Assignee: Accenture Global Solutions Limited, Dublin (IE)

(*) Notice: Subject to any disclaimer, the term of this patent is extended or adjusted under 35 U.S.C. 154(b) by 6 days.

(21) Appl. No.: 17/164,355

(22) Filed: Feb. 1, 2021

(65) Prior Publication Data
US 2022/0244937 A1    Aug. 4, 2022

(51) Int. Cl.
*G06F 8/65*         (2018.01)
*G06F 8/71*         (2018.01)
(Continued)

(52) U.S. Cl.
CPC .............. *G06F 8/65* (2013.01); *G06F 8/71* (2013.01); *G06F 11/3616* (2013.01);
(Continued)

(58) Field of Classification Search
CPC .......... G06F 8/65; G06F 8/71; G06F 11/3616; G06K 9/6215; G06K 9/6218; G06K 9/6256; G06N 20/00
See application file for complete search history.

(56) References Cited

U.S. PATENT DOCUMENTS

2008/0263505 A1* 10/2008 StClair ...................... G06F 8/10
                                                            717/106
2017/0212829 A1*  7/2017 Bales ................... G06N 3/0454
(Continued)

FOREIGN PATENT DOCUMENTS

WO    WO-2020065326 A1 *  4/2020 ........... G06F 16/358

OTHER PUBLICATIONS

"Rasa NLU: Language Understanding for Chatbots and AI assistants," Rasa Technologies, 2020, https://legacy-docs-v1.rasa.com/nlu/about/.
(Continued)

*Primary Examiner* — Daxin Wu
(74) *Attorney, Agent, or Firm* — Harrity & Harrity, LLP

(57) ABSTRACT

A device may receive requirement data identifying a requirement for modification of software code, and may process the requirement data, with a machine learning model, to identify entities and intents in the software code and to generate a query. The device may process the query, with a code locator model, to encode text of the query into high-dimensional vectors and to identify a semantic similarity between the high-dimensional vectors and code text. The device may process the query, the semantic similarity, and the code text, with a code developer model, to generate metadata, and may utilize the metadata to identify an identifier associated with the software code. The device may determine, utilizing the identifier, a portion of the software code, and may modify the portion of the software code based on the query to generate modified software code. The device may perform actions based on the modified software code.

20 Claims, 11 Drawing Sheets

(51) Int. Cl.
*G06N 20/00* (2019.01)
*G06F 11/36* (2006.01)
*G06K 9/62* (2022.01)

(52) U.S. Cl.
CPC ......... *G06K 9/6215* (2013.01); *G06K 9/6218* (2013.01); *G06K 9/6256* (2013.01); *G06N 20/00* (2019.01)

(56) References Cited

U.S. PATENT DOCUMENTS

| | | | |
|---|---|---|---|
| 2020/0104631 A1* | 4/2020 | Zhang | G06N 5/022 |
| 2021/0124738 A1* | 4/2021 | Swamy | G06F 16/211 |
| 2021/0240742 A1* | 8/2021 | Wang | G06Q 30/0283 |
| 2021/0312134 A1* | 10/2021 | Creed | G06F 40/237 |
| 2021/0350082 A1* | 11/2021 | Huang | G06F 16/258 |
| 2021/0350183 A1* | 11/2021 | Liu | G06K 9/6218 |
| 2021/0383068 A1* | 12/2021 | Mattivi | G06F 16/9024 |
| 2021/0406152 A1* | 12/2021 | Quemy | G06F 11/3624 |

OTHER PUBLICATIONS

"TensorFlow 2 quickstart for beginners," TensorFlow, https://www.tensorflow.org/tutorials/quickstart/beginner.

* cited by examiner

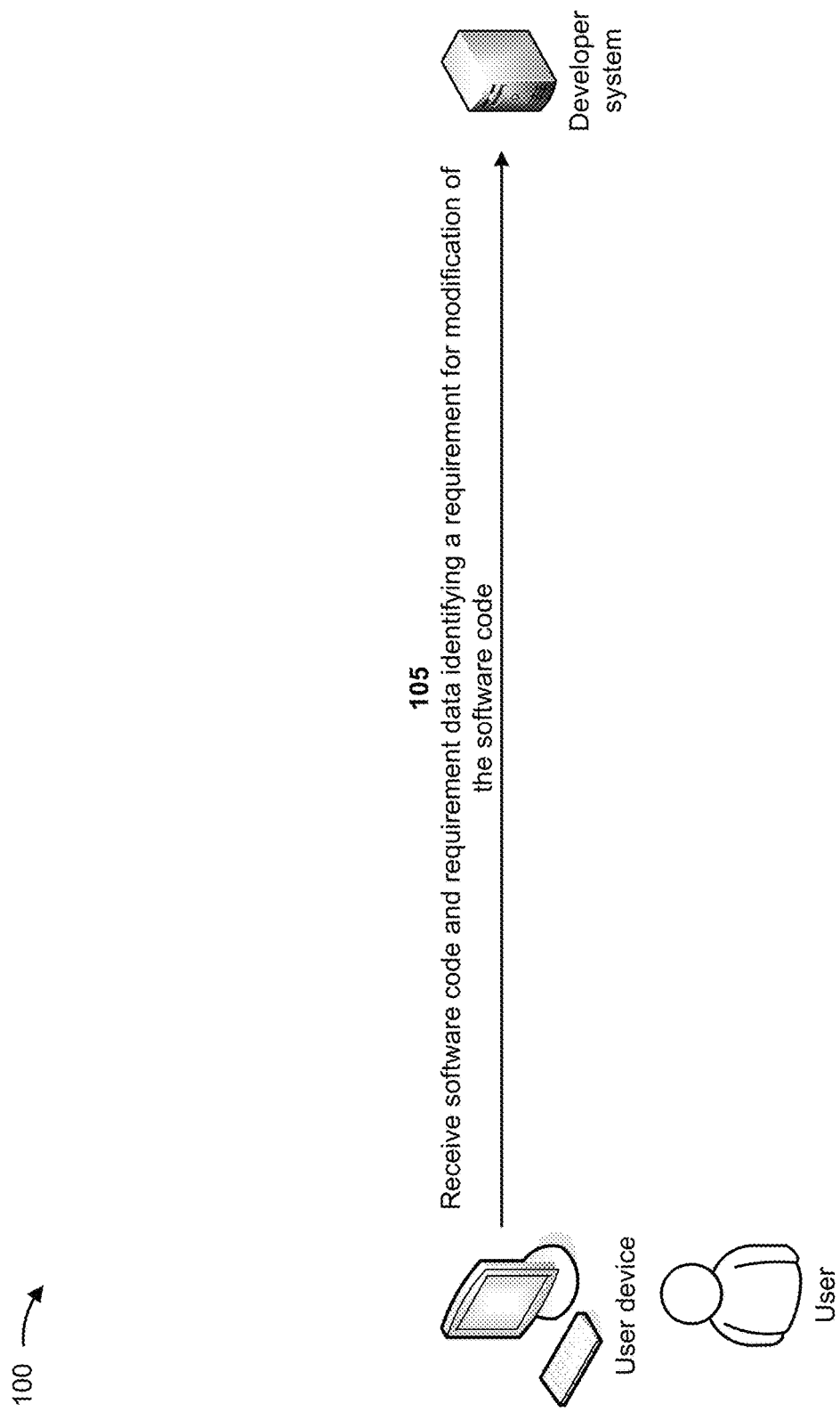

UTILIZING MACHINE LEARNING MODELS FOR AUTOMATED SOFTWARE CODE MODIFICATION

BACKGROUND

Software code development involves translating requirements or user stories into a piece of technology-specific code that performs a desired functionality as specified in the requirements. A software development life cycle includes planning for the software code, identifying requirements for the software code, designing the software code, developing the software code, testing the software code, implementing the software code, and maintaining the software code.

SUMMARY

In some implementations, a method may include receiving requirement data identifying a requirement for modification of software code, and processing the requirement data, with a machine learning model, to identify one or more entities and one or more intents in the software code and to generate a query based on the one or more entities and the one or more intents. The method may include processing the query, with a code locator model, to encode text of the query into high-dimensional vectors and to identify a semantic similarity between the high-dimensional vectors and code text provided in the software code. The method may include processing the query, the semantic similarity, and the code text, with a code developer model, to generate metadata, and utilizing the metadata to identify an identifier associated with the software code. The method may include determining, with the code developer model and utilizing the identifier, a portion of the software code, and modifying the portion of the software code based on the query to generate modified software code. The method may include performing one or more actions based on the modified software code.

In some implementations, a device includes one or more memories and one or more processors to receive requirement data identifying a requirement for modification of software code, and process the requirement data, with a machine reasoning model, to identify one or more entities and one or more intents in the software code and to generate a query based on the one or more entities and the one or more intents. The one or more processors may process the query, with a code locator model, to encode text of the query into high-dimensional vectors and to identify a semantic similarity between the high-dimensional vectors and code text provided in the software code, wherein the code locator model includes a universal sentence encoder that is trained with a two-deep averaging network encoder in parallel with a different drop rate, a composition function, and by determining an average of similarity confidence. The one or more processors may process the query, the semantic similarity, and the code text, with a code developer model, to generate metadata, and may utilize the metadata to identify an identifier associated with the software code. The one or more processors may determine, with the code developer model and utilizing the identifier, a portion of the software code, and may modify the portion of the software code based on the query to generate modified software code. The one or more processors may perform one or more actions based on the modified software code.

In some implementations, a non-transitory computer-readable medium may store a set of instructions that includes one or more instructions that, when executed by one or more processors of a device, cause the device to receive requirement data identifying a requirement for modification of software code, and process the requirement data, with a machine learning model, to identify one or more entities and one or more intents in the software code and to generate a query based on the one or more entities and the one or more intents. The one or more instructions may cause the device to process the query, with a code locator model, to encode text of the query into high-dimensional vectors and to identify a semantic similarity between the high-dimensional vectors and code text provided in the software code. The one or more instructions may cause the device to process the query, the semantic similarity, and the code text, with a code developer model, to generate metadata, and utilize the metadata to identify an identifier associated with the software code. The one or more instructions may cause the device to determine, with the code developer model and utilizing the identifier, a portion of the software code, and modify the portion of the software code based on the query to generate modified software code. The one or more instructions may cause the device to cause the modified software code to be implemented in production.

BRIEF DESCRIPTION OF THE DRAWINGS

FIGS. 1A-1F are diagrams of an example implementation described herein.

DETAILED DESCRIPTION

Figure 1B:
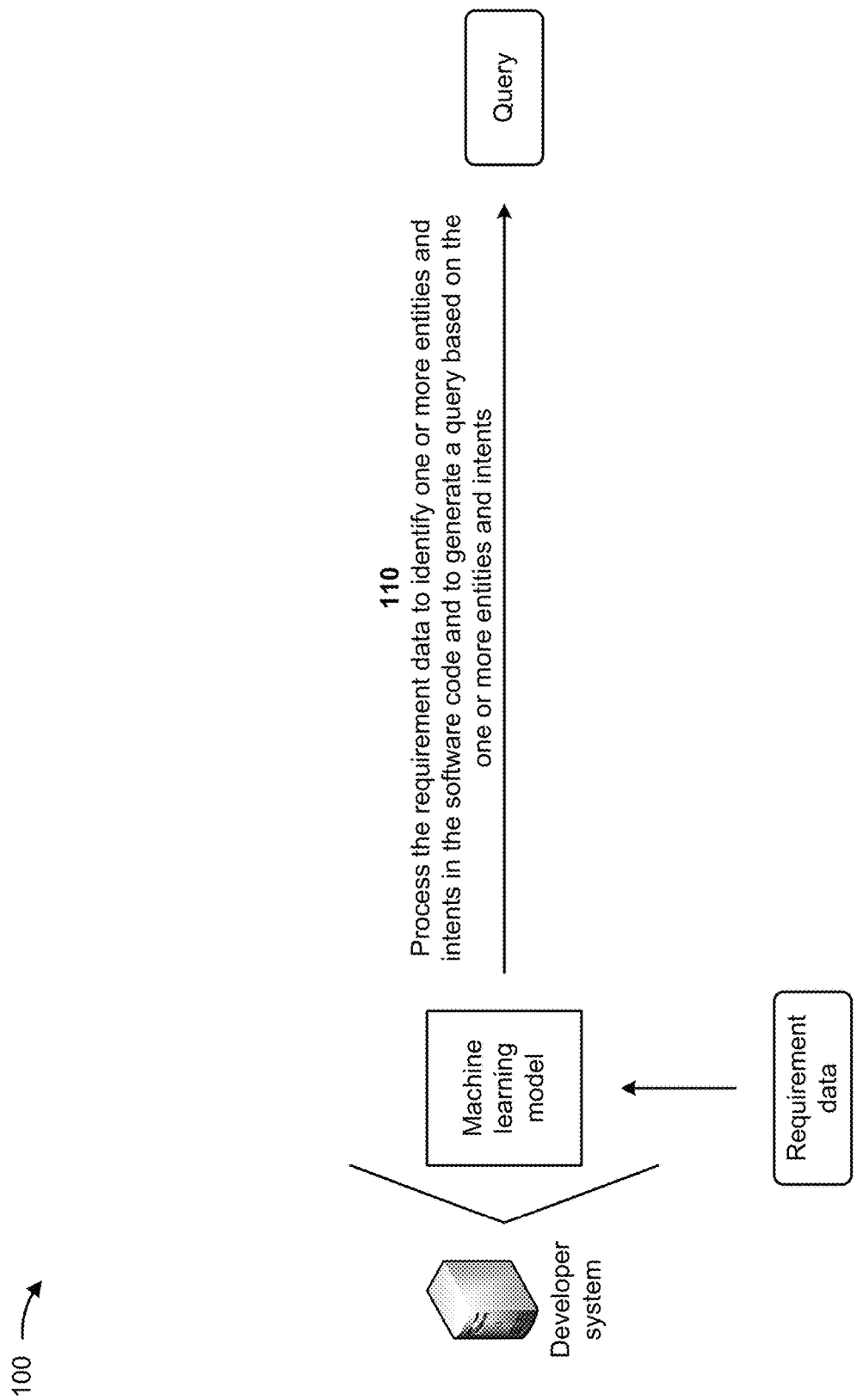

The following detailed description of example implementations refers to the accompanying drawings. The same reference numbers in different drawings may identify the same or similar elements.

There has been less innovation and automation in software design and build phase in comparison to other phases of the software development life cycle. For example, modification of functionalities of existing software code requires significant manual intervention, which is time consuming. The software code modification may not be implemented in a scheduled time frame due to delays in software code development (e.g., caused by bugs, errors, and/or the like), failure to meet requirements, poor software code quality, and/or the like. Modifying software code involves changing multiple lines of code in a large code repository. However, locating the multiple lines of code is extremely time consuming and changing the multiple lines of code cannot be automatically implemented. This, in turn, wastes computing resources (e.g., processing resources, memory resources, communication resources, and/or the like), networking resources, human resources, and/or the like associated with identifying lines of software code to be modified, correctly modifying the correct lines of software code, training software developers to identify and properly correct the lines of software code, and/or the like.

Some implementations described herein relate to a developer system that utilizes machine learning models for automated software code modification. For example, the developer system may receive requirement data identifying a requirement for modification of software code, and process the requirement data, with a machine learning model, to identify one or more entities and one or more intents in the software code and to generate a query based on the one or more entities and the one or more intents. The developer system may process the query, with a code locator model, to encode text of the query into high-dimensional vectors and to identify a semantic similarity between the high-dimensional vectors and code text provided in the software code, and may process the query, the semantic similarity, and the code text, with a code developer model, to generate metadata. The developer system may utilize the metadata to identify an identifier associated with the software code, and may determine, with the code developer model and utilizing the identifier, a portion of the software code. The developer system may modify the portion of the software code based on the query to generate modified software code, and may perform one or more actions based on the modified software code.

In this way, the developer system utilizes machine learning models for automated software code modification. The developer system may utilize a machine learning model to parse software code modification requirements into entities, relationships, intents, values, contexts, and/or the like. The developer system may process the parsed modification requirements, with a code locator model, to locate lines of the software code to modify (e.g., based on software code comments). The developer system may utilize a code developer model to modify the lines of the software code to generate modified software code, and may deploy the modified software code in production. This, in turn, conserves computing resources, human resources, and/or the like that would otherwise have been wasted in identifying lines of software code to be modified, correctly modifying the correct lines of software code, training software developers to identify and properly correct the lines of software code, and/or the like.

FIGS. 1A-1F are diagrams of an example 100 associated with utilizing machine learning models for automated software code modification. As shown in FIGS. 1A-1F, example 100 includes a user device associated with a developer system. The user device may include a laptop computer, a mobile telephone, a desktop computer, and/or the like utilized by a user (e.g., a security analyst). The developer system may include a system that utilizes machine learning models for automated software code modification, as described herein.

As shown in FIG. 1A, and by reference number 105, the developer system receives software code and requirement data identifying a requirement for modification of the software code from the user device. The software code may be associated with an application and the requirement for modification of the software code may include information identifying a modification to a functionality of the application. As an example, a user may identify a modification to be made to a functionality of an application. The user may input information associated with the application (e.g., the software code associated with the application and/or the functionality of the application, an identifier associated with the software code, a memory location storing the software code, information identifying the application, and/or the like) and requirement data identifying the modification of the software code via the user device. The user device may obtain the software code based on the information associated with the software code and may provide the software code and the requirement data to the developer system.

In some implementations, the requirement data may include a textual input and/or a voice input. For example, the user may provide a textual input and/or a voice input identifying a requirement for a modification of the software code via a chat bot provided by the user device and/or associated with the developer system. In some implementations, when the requirement data includes a voice input, the developer system may perform natural language processing (NLP) on the voice input to generate textual data corresponding to the voice input.

In some implementations, the developer system may determine a language (e.g., English, Spanish, Italian, and/or the like) in which the requirement data was provided. For example, the developer system may determine the language in which the requirement data was provided based on performing one or more NLP techniques. The developer system may determine whether the language is a language utilized by the developer system. The developer system may convert the requirements data to the language utilized by the developer system when the language in which the requirements data was provided is different from the language utilized by the developer system.

As shown in FIG. 1B, and by reference number 110, the developer system processes the requirement data to identify one or more entities and intents in the software code and to generate a query based on the one or more entities and intents. The developer system may utilize a machine learning model and/or a machine reasoning model to process the requirement data. In some implementations, the developer system may utilize the machine learning model and/or the machine reasoning model based on whether text, corresponding to the requirement data, is structured text or unstructured text. The developer system may utilize the machine learning model to process the requirement data when the text is structured text. The developer system may utilize the machine reasoning model when the text is unstructured text.

In some implementations, the developer system parses the requirement data to generate parsed data. For example, the developer system may utilize the machine learning model to perform machine learning based parsing when the text is structured text, and may utilize the machine reasoning model to perform machine reasoning based parsing when the text is unstructured text to generate the parsed data. The developer system may identify the one or more entities, one or more relationships between the one or more entities, a context associated with the requirement data, one or more slot values (e.g., a value associated with an entity such as a quantity, a date, a time period, and/or the like), and the one or more intents based on the parsed data. The developer system may generate the query based on identifying the one or more entities, the one or more relationships between the one or more entities, the context, the one or more slot values, and the one or more intents.

In some implementations, the developer system utilizes a knowledge graph to generate the query. The knowledge graph may represent a collection of interlinked descriptions of entities. A link between two entities may represent a context and/or a relationship between the two entities. The developer system may identify one or more descriptions of entities associated with the one or more entities from the parsed data. The developer system may map the one or more entities with the one or more intents based on the identified descriptions of entities. The developer system may generate the query based on mapping the one or more entities with the one or more intents.

Figure 1C:
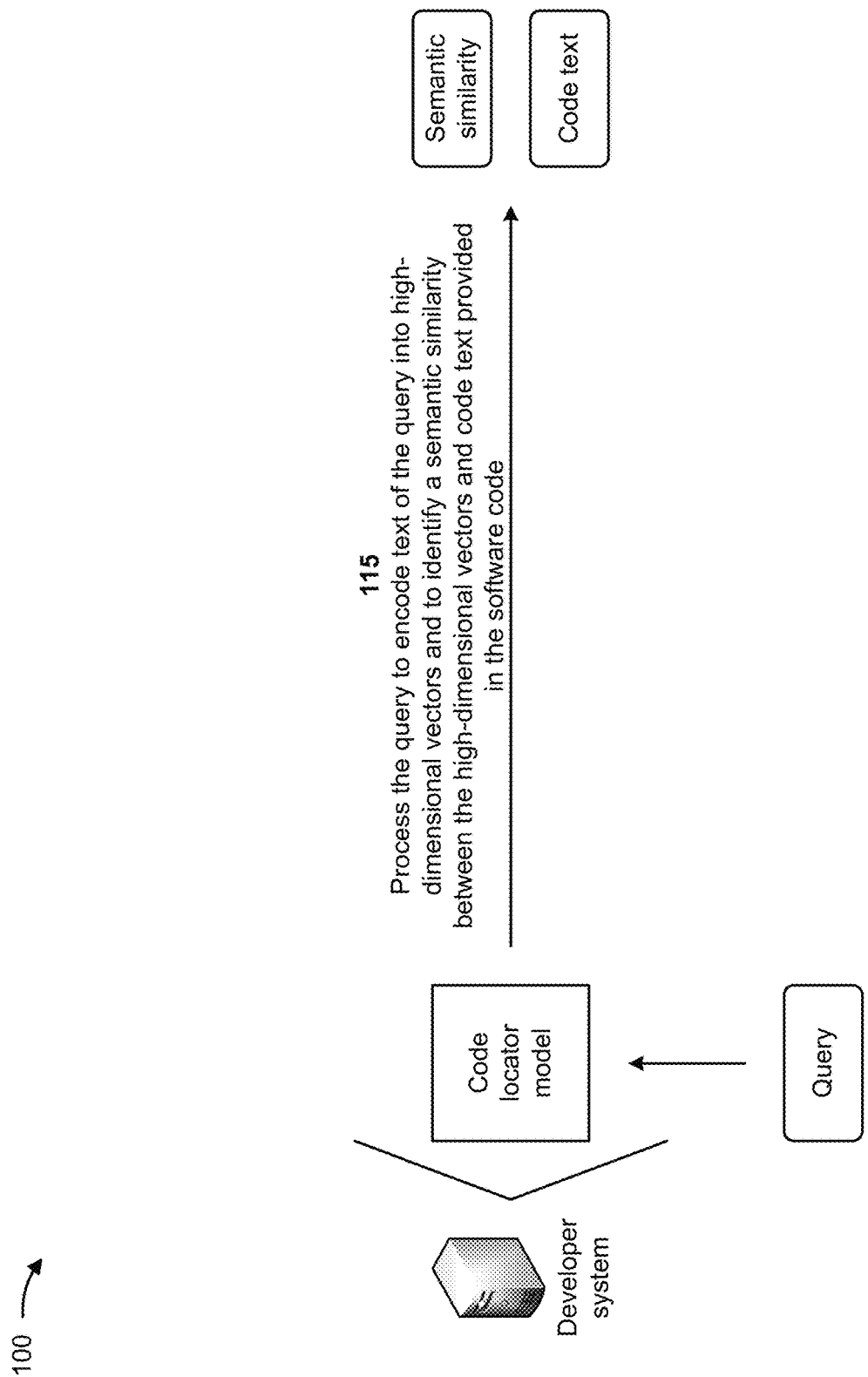

As shown in FIG. 1C, and by reference number 115, the developer system processes the query to encode text of the query into high-dimensional vectors and to identify a semantic similarity between the high-dimensional vectors and code text provided in the software code. For example, the developer system may process the query with a code locator model to encode text of the query into high-dimensional vectors (e.g., 256-dimension vectors, 512-dimension vectors, and/or the like) and to identify a semantic similarity between the high-dimensional vectors and code text provided in the software code.

In some implementations, the code locator model includes a universal sentence encoder. The universal sentence encoder may be trained with a two-deep averaging network encoder in parallel with a different drop rate, a composition function, and/or by determining an average of similarity confidence. The developer system may utilize the universal sentence encoder to encode the text of the query into the high-dimensional vectors.

The developer system may classify the text of the query based on the high-dimensional vectors to generate classified text. The developer system may cluster the classified text to determine a similarity confidence between the classified text and code text (e.g., a comment associated with the software code, a portion of the software code, metadata associated with the software code, and/or the like). The developer system may identify the semantic similarity between the high-dimensional vectors and the code text based on clustering the classified text to determine the similarity confidence. In some implementations, the developer system determines the semantic similarity between the high-dimensional vectors based on cosine similarities between pairs of the high-dimensional vectors in an inner product space.

Figure 1D:
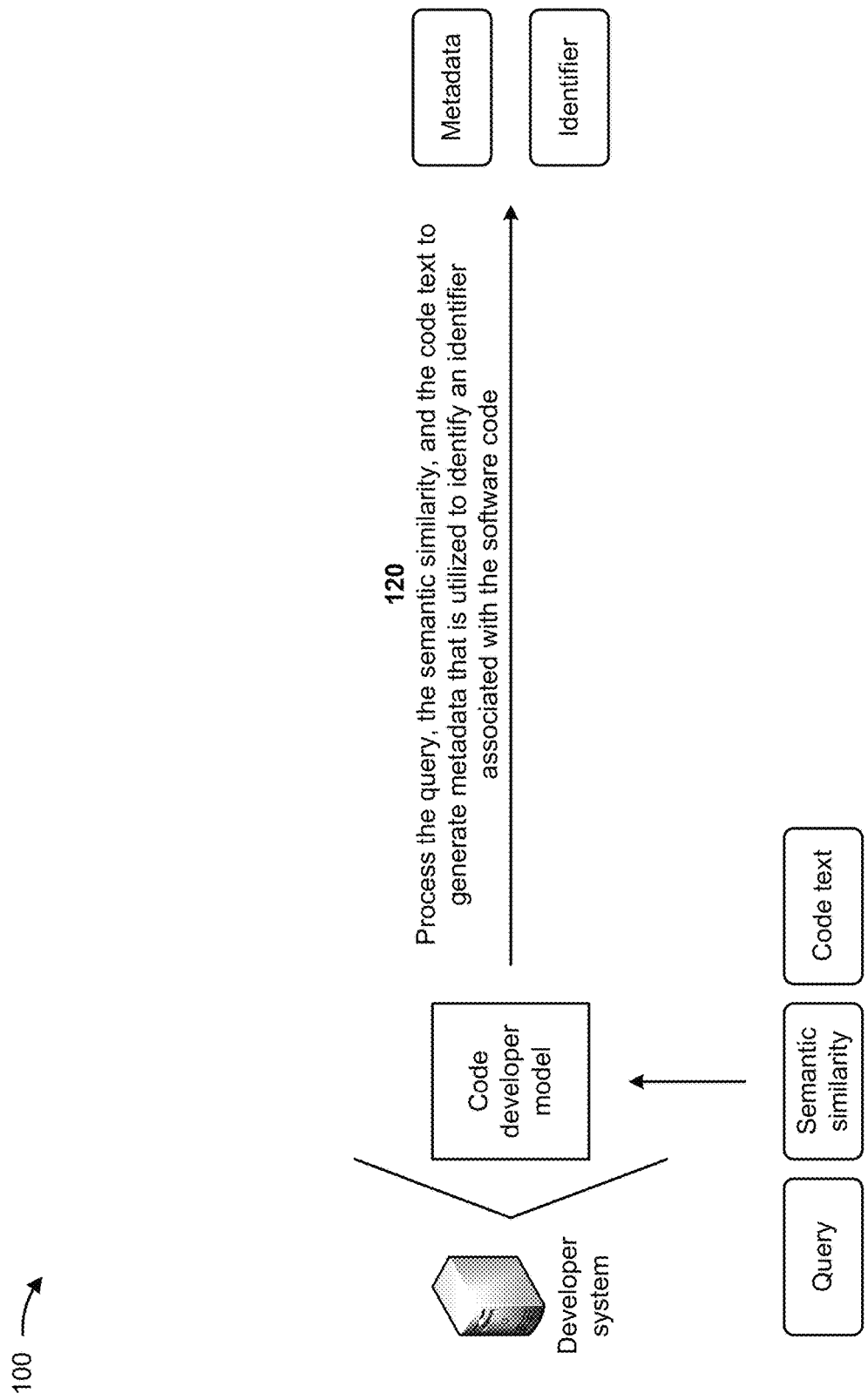

As shown in FIG. 1D, and by reference number 120, the developer system processes the query, the semantic similarity, and the code text to generate metadata that is utilized to identify an identifier associated with the software code. In some implementations, the developer system generates the metadata based on the one or more entities of the query and based on the semantic similarity. Alternatively, and/or additionally, the developer system may process the query, the semantic similarity, and the code text, with a code developer model to generate the metadata.

Figure 1E:
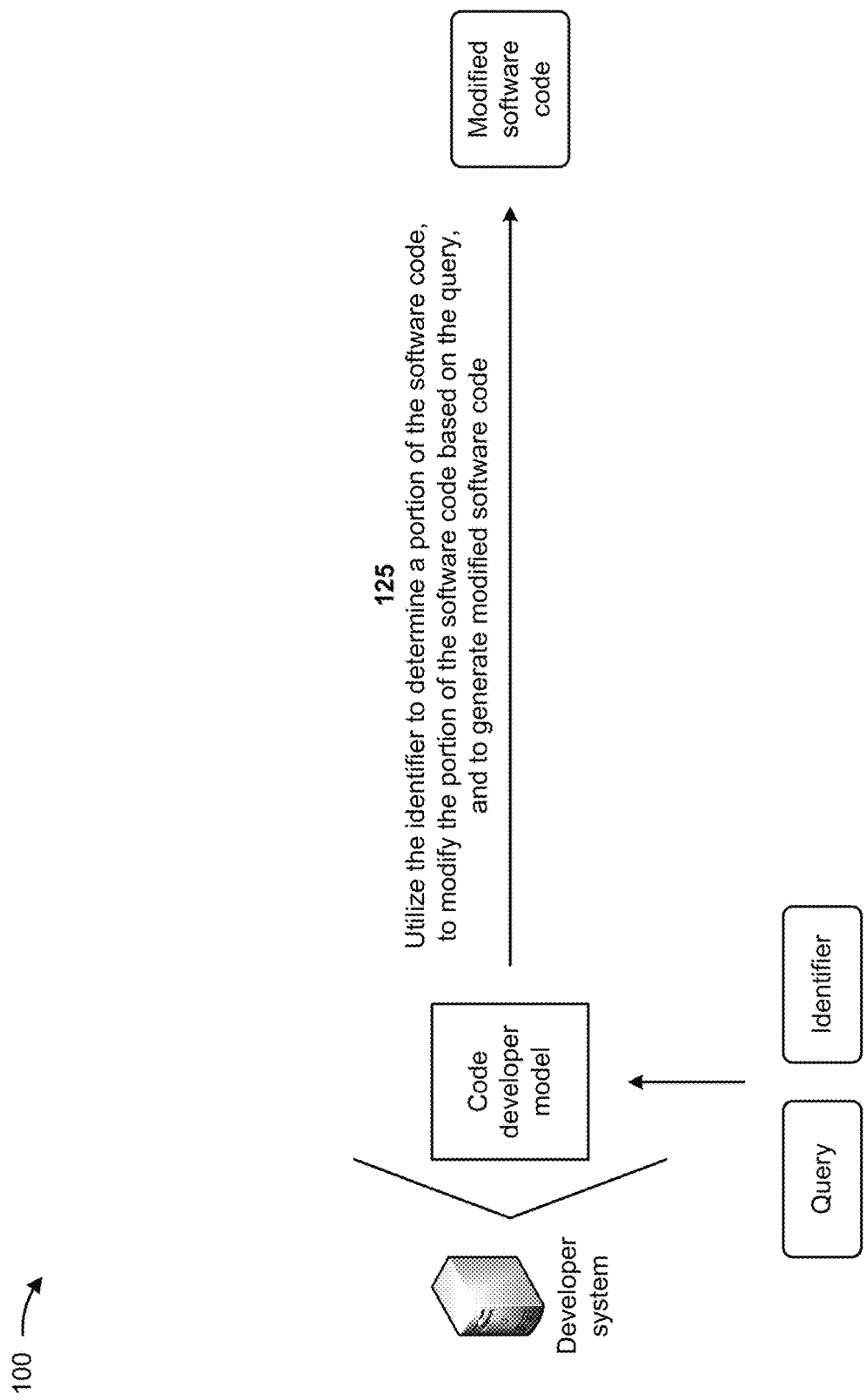

As shown in FIG. 1E, and by reference number 125, the developer system utilizes the identifier to determine a portion of the software code, to modify the portion of the software code based on the query, and to generate modified software code. In some implementations, the developer system utilizes the code developer model to determine a portion of the software code associated with the function of the application based on the identifier. The developer system may perform a semantic search on the software code based on the code text to determine a similarity between portions of the software code, database entities, and/or the like and the code text. The developer system may identify a location of a portion of the software code associated with the functionality of the application that is to be modified, a database entity associated with the functionality of the application, and/or the like based on the determined similarities.

The developer system may modify the portion of the software code based on the query to generate the modified software code. For example, the developer system may modify the portion of the software code based on the entities and/or intents associated with the query. In some implementations, the developer system generates a change request script configured to modify the portion of the software. In some implementations, the developer system utilizes a machine learning model to generate the change request script based on the metadata. In some implementations, the developer system automatically executes the change request script to generate the modified software code. For example, the developer system may automatically execute the change request script when a confidence score associated with identifying the portion of the software code satisfies a confidence score threshold.

Figure 1F:
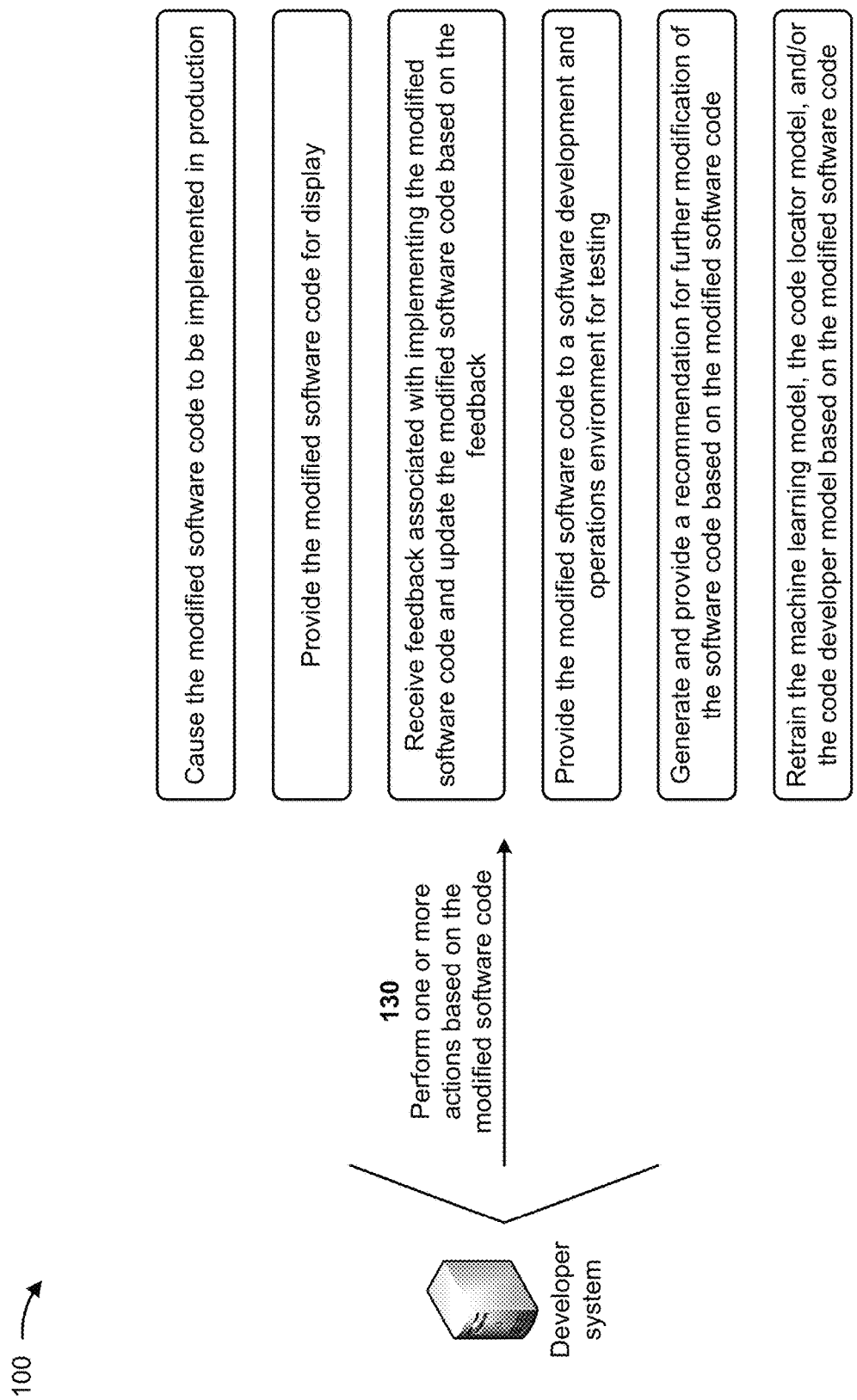

As shown in FIG. 1F, and by reference number 130, the developer system may perform one or more actions based on the modified software code. In some implementations, the one or more actions include the developer system causing the modified software code to be implemented in production. For example, the developer system may cause the modified software code to be implemented in production based on generating the modified software code. In some implementations, the developer system causes the modified software code to be implemented in production when a confidence score associated with identifying the portion of the software code and/or associated with modifying the portion of the software code satisfies a confidence score threshold.

In some implementations, the one or more actions include the developer system providing the modified software code for display. For example, the developer system may provide the modified code to the user device to cause the user device to provide the modified code for display to the user.

In some implementations, the one or more actions include receiving feedback associated with implementing the modified software code and updating the modified software code based on the feedback. For example, the developer system may receive feedback associated with implementing the modified software code based on providing the modified software code for display to the user. In some implementations, the feedback includes additional requirement data associated with the modified software code. The developer system may further modify the modified software code based on the additional requirement data. In some implementations, the developer system further modifies the modified software code in a manner similar to that described above. Alternatively, and/or additionally, the feedback may include information indicating whether the modified software code is to be tested, whether the modified software code is to be implemented in production, and/or the like.

In some implementations, the one or more actions include the developer system providing the modified software code to a software development and operations environment for testing. For example, the developer system may provide the modified software code to a software development and operations environment for testing based on determining that the feedback includes information indicating that the modified software code is to be tested and/or that the modified software code is to be implemented in production.

In some implementations, the one or more actions include the developer system generating and/or providing a recommendation for further modification of the software code based on the modified software code. The developer system may provide the modified software code to a software development and operations environment for testing and may obtain a result of the testing. The developer system may determine one or more modifications associated with the software code based on the result of the testing and may provide a recommendation for further modification of the software code based on the one or more modifications.

In some implementations, the one or more actions include the developer system retraining the machine learning model, the code locator model, and/or the code developer model based on the modified software code. The developer system may utilize the modified software code as additional training data for retraining the machine learning model, the code locator model, and/or the code developer model, thereby increasing the quantity of training data available for training the machine learning model, the code locator model, and/or the code developer model. Accordingly, the developer system may conserve computing resources associated with identifying, obtaining, and/or generating historical data for training the machine learning model, the code locator model, and/or the code developer model relative to other systems for identifying, obtaining, and/or generating historical data for training machine learning models.

In this way, the developer system utilizes machine learning models for automated software code modification. The developer system may utilize a machine learning model to parse software code modification requirements into entities, relationships, intents, values, contexts, and/or the like. The developer system may process the parsed modification requirements, with a code locator model, to locate lines of the software code to modify (e.g., based on software code comments). The developer system may utilize a code developer model to modify the lines of the software code to generate modified software code, and may deploy the modified software code in production. This, in turn, conserves computing resources, human resources, and/or the like that would otherwise have been wasted in identifying lines of software code to be modified, correctly modifying the correct lines of software code, training software developers to identify and properly correct the lines of software code, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
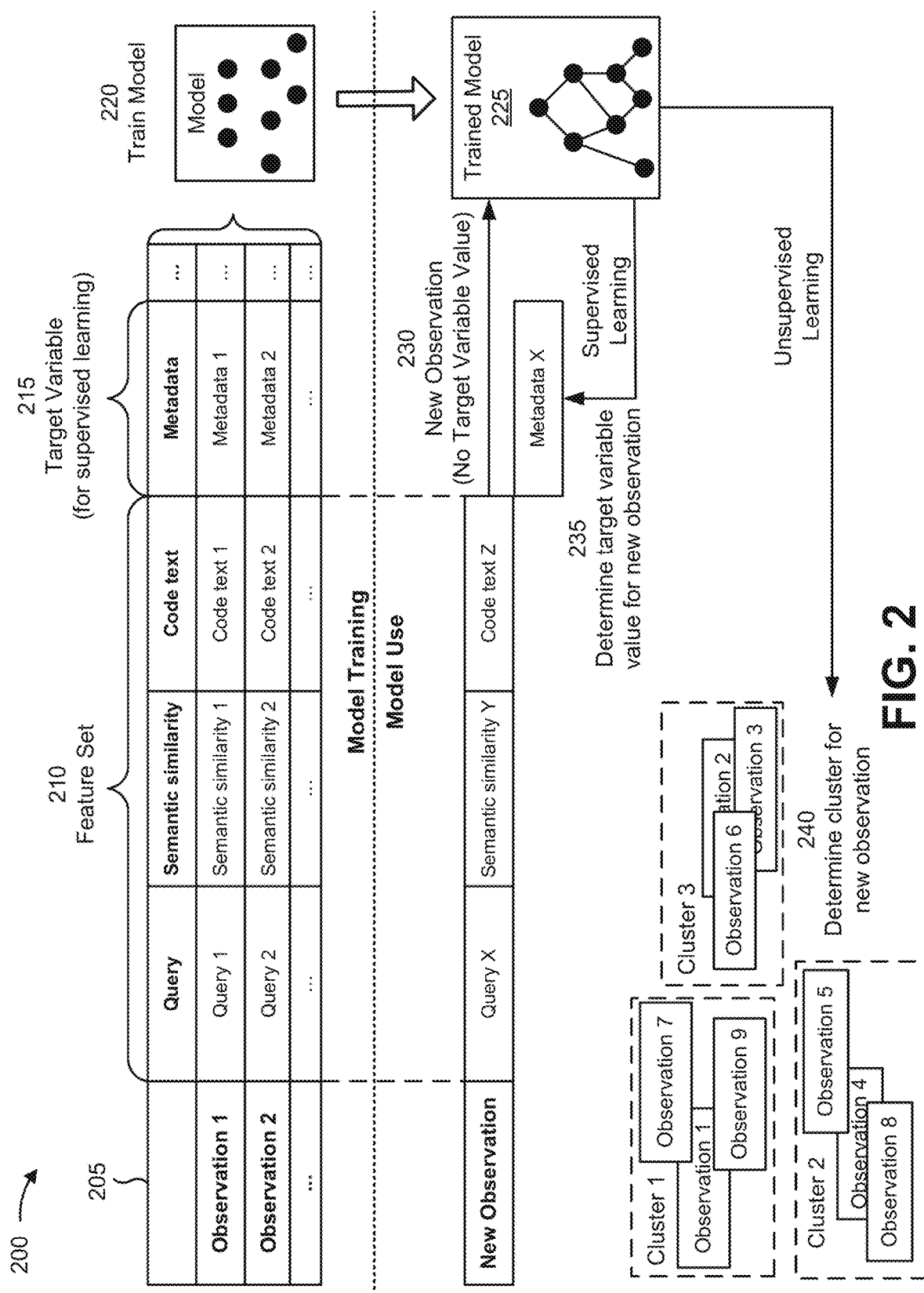
FIG. 2 is a diagram illustrating an example of training and using a machine learning model in connection with automated software code modification.

FIG. 2 is a diagram illustrating an example 200 of training and using a machine learning model (e.g., the machine learning model used to process the requirement data, the machine reasoning model used to process the requirement data, the code locator model, or the code developer model) in connection with automated software code modification. The machine learning model training and usage described herein may be performed using a machine learning system. The machine learning system may include or may be included in a computing device, a server, a cloud computing environment, and/or the like, such as the developer system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the developer system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the developer system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of query data, a second feature of semantic similarity data, a third feature of code text data, and so on. As shown, for a first observation, the first feature may have a value of query 1, the second feature may have a value of semantic similarity 1, the third feature may have a value of code text 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is metadata, which has a value of metadata 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of query X, a second feature of semantic similarity Y, a third feature of code text Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of metadata X for the target variable of metadata for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a query data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a semantic similarity data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to perform automated software code modification. The machine learning system enables recognition and/or identification of tens, hundreds, thousands, or millions of features and/or feature values for tens, hundreds, thousands, or millions of observations, thereby increasing accuracy and consistency and reducing delay associated with performing automated software code modification relative to requiring computing resources to be allocated for tens, hundreds, or thousands of operators to manually perform automated software code modification.

As indicated above, FIG. 2 is provided as an example. Other examples may differ from what is described in connection with FIG. 2.

Figure 3:
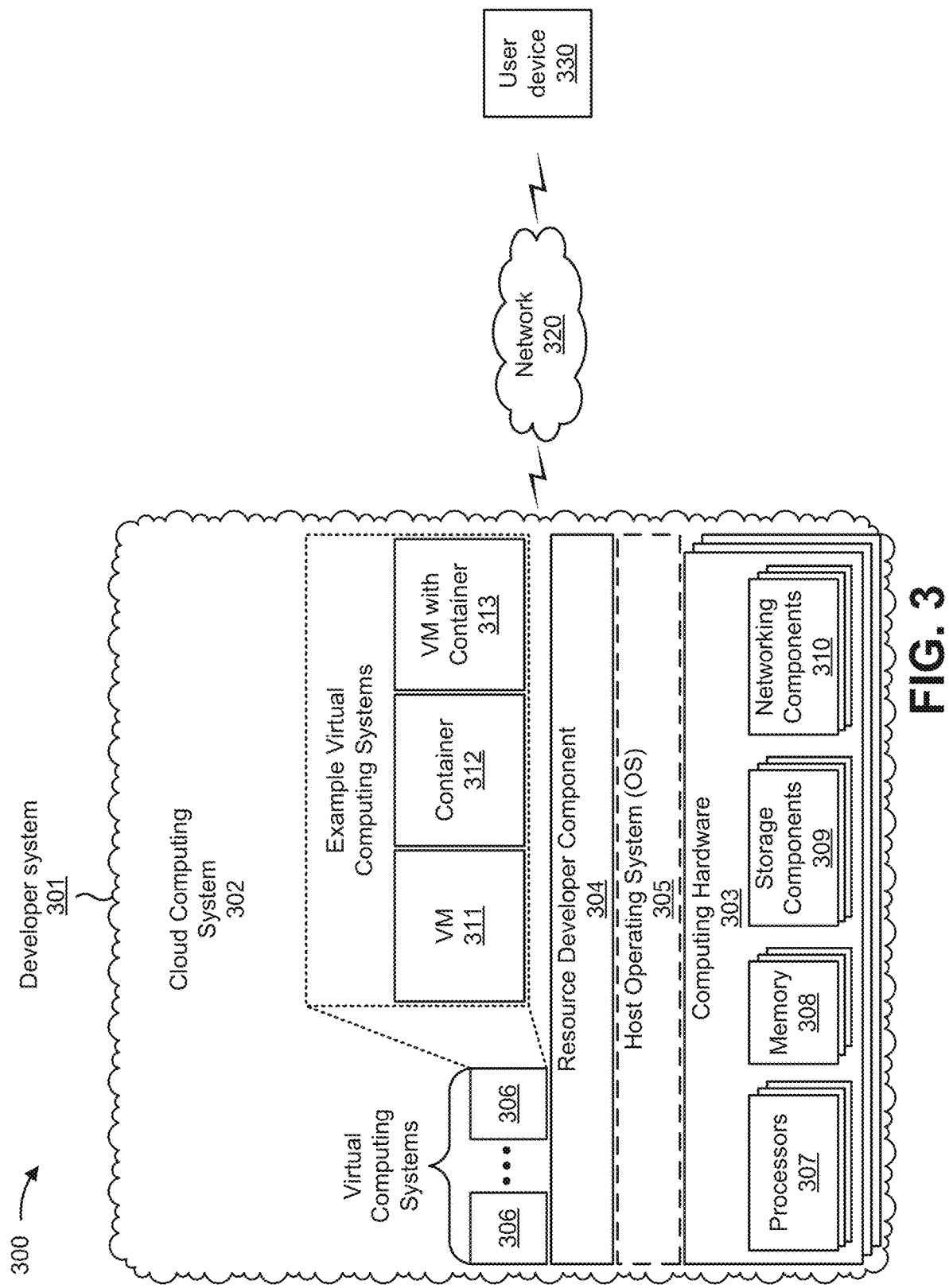
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a developer system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the developer system 301 may include one or more elements 303-313 of the cloud computing system 302, may execute within the cloud computing system 302, and/or may be hosted within the cloud computing system 302, in some implementations, the developer system 301 may not be cloud-based (e.g., may be implemented outside of a cloud computing system) or may be partially cloud-based. For example, the developer system 301 may include one or more devices that are not part of the cloud computing system 302, such as device 400 of FIG. 4, which may include a stand-alone server or another type of computing device. The developer system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
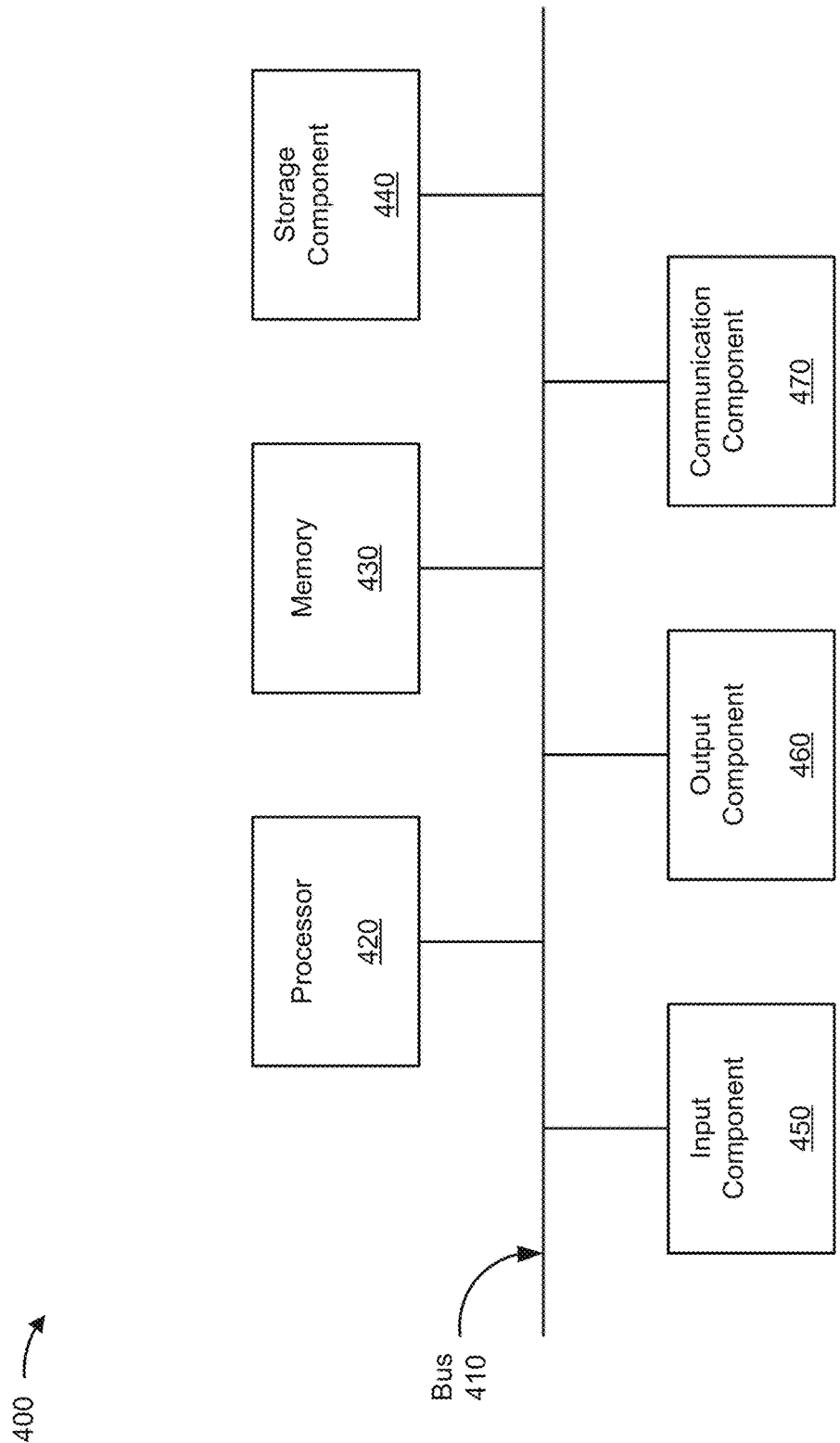
FIG. 4 is a diagram of example components of one or more devices of FIG. 3.

FIG. 4 is a diagram of example components of a device 400, which may correspond to developer system 301 and/or user device 330. In some implementations, developer system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
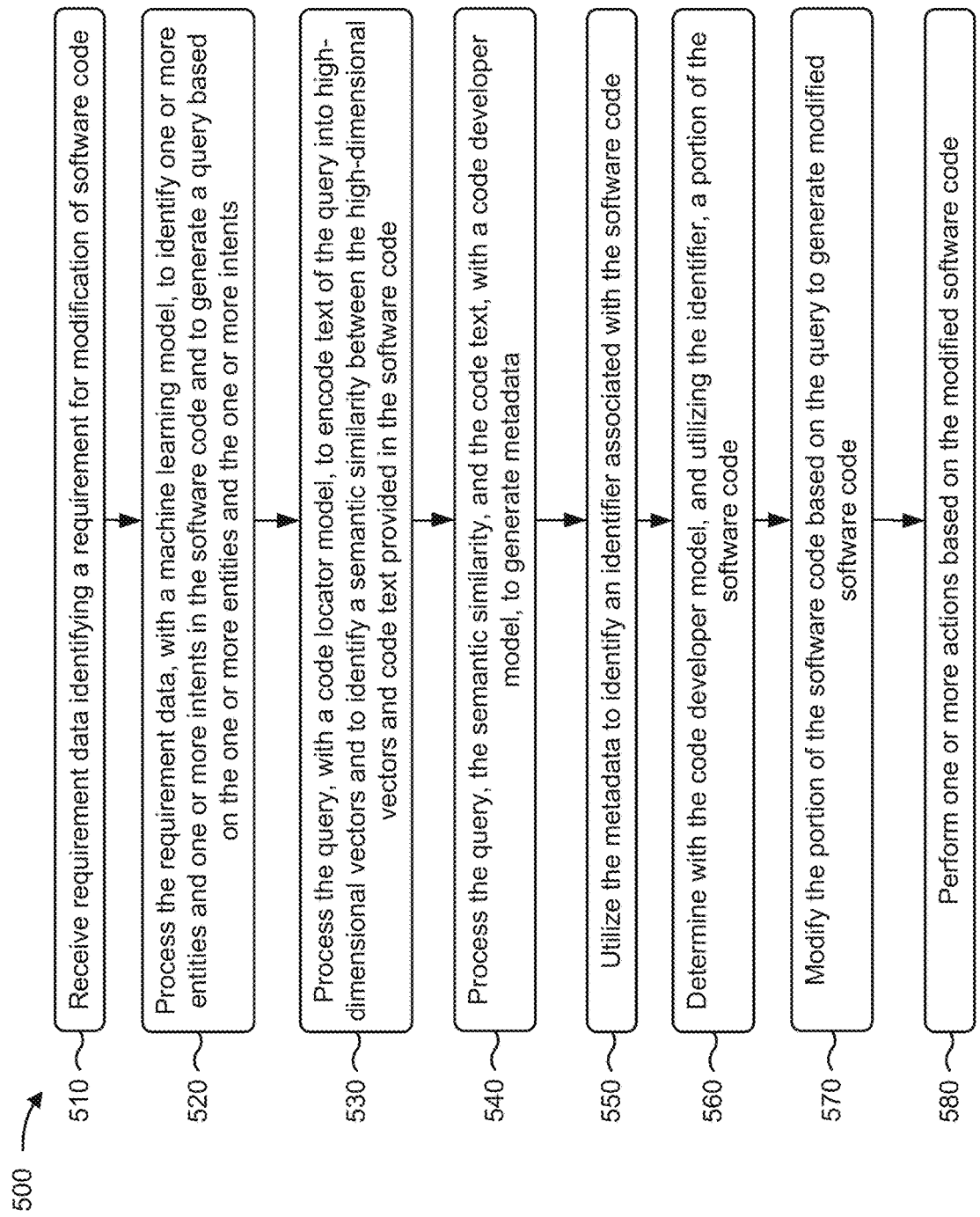
FIGS. 5 and 6 are flowcharts of example processes for utilizing machine learning models for automated software code modification.

FIG. 5 is a flowchart of an example process 500 for utilizing machine learning models for automated software code modification. In some implementations, one or more process blocks of FIG. 5 may be performed by a device (e.g., developer system 301). In some implementations, one or more process blocks of FIG. 5 may be performed by another device or a group of devices separate from or including the device, such as a user device (e.g., user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving requirement data identifying a requirement for modification of software code (block 510). For example, the device may receive requirement data identifying a requirement for modification of software code, as described above. In some implementations, the device may receive the requirement data via a textual input and/or a voice input. The device may perform, when the requirement data is received via the voice input, natural language processing on the voice input to generate textual data.

As further shown in FIG. 5, process 500 may include processing the requirement data, with a machine learning model, to identify one or more entities and one or more intents in the software code and to generate a query based on the one or more entities and the one or more intents (block 520). For example, the device may process the requirement data, with a machine learning model, to identify one or more entities and one or more intents in the software code and to generate a query based on the one or more entities and the one or more intents, as described above. The machine learning model may be a machine reasoning model.

In some implementations, when processing the requirement data, with the machine learning model, the device may generate a knowledge graph based on the requirement data. The device may extract the one or more entities from the knowledge graph. The device may map the one or more entities with the one or more intents based on the knowledge graph. The device may generate the query based on mapping the one or more entities with the one or more intents.

In some implementations, the device may parse the requirement data to generate parsed data. The device may identify the one or more entities and the one or more intents based on the parsed data. The device may generate the query based on identifying the one or more entities and the one or more intents.

As further shown in FIG. 5, process 500 may include processing the query, with a code locator model, to encode text of the query into high-dimensional vectors and to identify a semantic similarity between the high-dimensional vectors and code text provided in the software code (block 530). For example, the device may process the query, with a code locator model, to encode text of the query into high-dimensional vectors and to identify a semantic similarity between the high-dimensional vectors and code text provided in the software code, as described above. In some implementations, the device may process the query in a manner similar to that described below with respect to FIG. 6. The code locator model may include a universal sentence encoder that is trained with a two-deep averaging network encoder in parallel with a different drop rate, a composition function, and by determining an average of similarity confidence.

In some implementations, when processing the query, with the code locator model, the device may utilize a universal sentence encoder to encode the text of the query into the high-dimensional vectors. The device may classify the text of the query based on the high-dimensional vectors to generate classified text. The device may cluster the classified text to determine a similarity confidence between the classified text and the code text. The device may identify the semantic similarity between the high-dimensional vectors and the code text based on clustering the classified text to determine the similarity confidence. The device may determine the semantic similarity between the high-dimensional vectors based on cosine similarities between pairs of the high-dimensional vectors in inner product space.

As further shown in FIG. 5, process 500 may include processing the query, the semantic similarity, and the code text, with a code developer model, to generate metadata (block 540). For example, the device may process the query, the semantic similarity, and the code text, with a code developer model, to generate metadata, as described above.

In some implementations, the device may generate the metadata based on the one or more entities of the query and based on the semantic similarity.

As further shown in FIG. 5, process 500 may include utilizing the metadata to identify an identifier associated with the software code (block 550). For example, the device may utilize the metadata to identify an identifier associated with the software code, as described above.

As further shown in FIG. 5, process 500 may include determining, with the code developer model and utilizing the identifier, a portion of the software code (block 560). For example, the device may determine, with the code developer model and utilizing the identifier, a portion of the software code, as described above. In some implementations, the device may retrieve the portion of the software code based on the identifier.

As further shown in FIG. 5, process 500 may include modifying the portion of the software code based on the query to generate modified software code (block 570). For example, the device may modify the portion of the software code based on the query to generate modified software code, as described above. In some implementations, the device may modify the portion of the software code based on the one or more entities and the one or more intents of the query.

As further shown in FIG. 5, process 500 may include performing one or more actions based on the modified software code (block 580). For example, the device may perform one or more actions based on the modified software code, as described above.

In some implementations, performing the one or more actions based on the modified software code includes one or more of causing the modified software code to be implemented in production; providing the modified software code for display; or receiving feedback associated with implementing the modified software code and updating the modified software code based on the feedback.

In some implementations, performing the one or more actions based on the modified software code includes one or more of providing the modified software code to a software development and operations environment for testing; generating and providing a recommendation for further modification of the software code based on the modified software code; or retraining at least one of the machine reasoning model, the code locator model, or the code developer model based on the modified software code.

In some implementations, performing the one or more actions based on the modified software code includes causing the modified software code to be implemented in production, receiving feedback associated with implementing the modified software code in production, and updating the modified software code based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
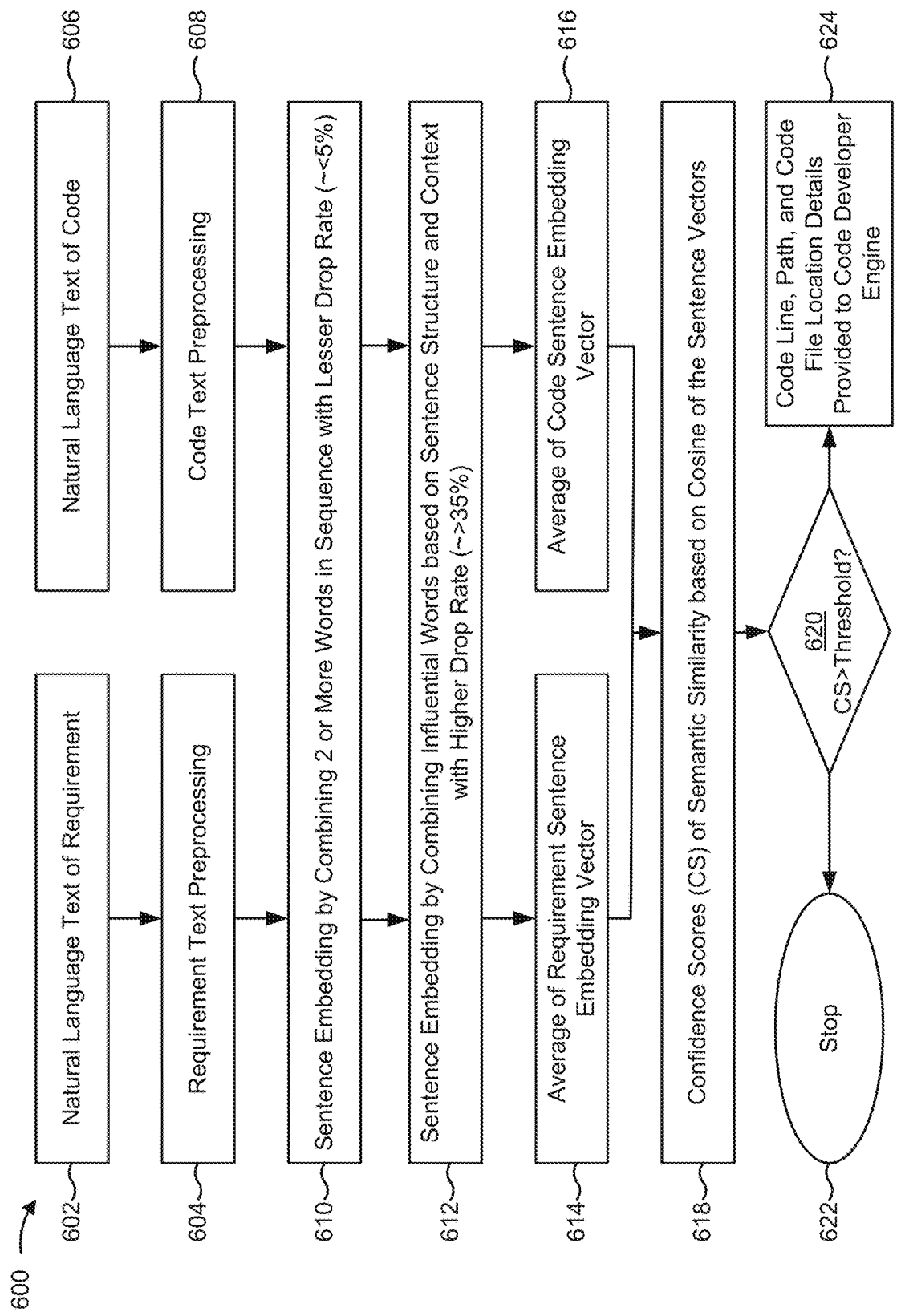

FIG. 6 is a flowchart of an example process 600 for processing a query. In some implementations, one or more process blocks of FIG. 6 may be performed by a device (e.g., developer system 301). In some implementations, one or more process blocks of FIG. 6 may be performed by another device or a group of devices separate from or including the device, such as a user device (e.g., user device 330). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include receiving natural language text of requirement data identifying a requirement for modification of software code (block 602). For example, the device may receive receiving natural language text of requirement data identifying a requirement for modification of software code, as described above.

As further shown in FIG. 6, process 600 may include preprocessing the natural language text of the requirement data (block 604). For example, the device may preprocess the natural language text of the requirement data, as described above.

As further shown in FIG. 6, process 600 may include receiving natural language text of the software code (block 606). For example, the device may receive natural language text of software code associated with the requirement data, as described above.

As further shown in FIG. 6, process 600 may include preprocessing the natural language text of the software code (block 608). For example, the device may preprocess the natural language text of the software code, as described above.

As further shown in FIG. 6, process 600 may include performing sentence embedding by combining two or more words in sequence having a lesser drop rate (block 610). For example, the device may perform sentence embedding by combining two or more words in sequence in the natural language text of the requirements data and/or the natural language text of the software code having a lesser drop rate, such as a drop rate less than about five percent. In some implementations, the device may perform the sentence embedding on both the natural language text of the requirement data and the natural language text of the software code.

As further shown in FIG. 6, process 600 may include performing sentence embedding by combining influential words based on sentence structure and context having a higher drop rate (block 612). For example, the device may perform sentence embedding by combining influential words in the natural language text of the requirements data and/or the natural language text of the software code based on sentence structure and context having a higher drop rate, such as a drop rate greater than about thirty-five percent. In some implementations, the device may perform the sentence embedding on both the natural language text of the requirement data and the natural language text of the software code.

As further shown in FIG. 6, process 600 may include determining an average of the requirement sentence embedding vectors (block 614). For example, the device may determine an average of the requirement sentence embedding vectors, as described above.

As further shown in FIG. 6, process 600 may include determining an average of the code sentence embedding vectors (block 616). For example, the device may determine an average of the code sentence embedding vectors, as described above.

As further shown in FIG. 6, process 600 may include determining confidence scores of semantic similarity based on a cosine of the sentence vectors (block 618). For example, the device may determine confidence scores of semantic similarity based on a cosine of the sentence vectors, as described above.

As further shown in FIG. 6, process 600 may include determining whether the confidence scores are greater than a threshold confidence score (block 620). For example, the device may obtain a threshold confidence score from a database and may determine whether the confidence scores are greater than the threshold confidence score, as described above.

In some implementations, the confidences scores are not greater than the threshold confidence score (block 620=No), and process 600 may include ending the process (block 622). In some implementations, the confidence scores are greater than the threshold confidence score (block 620=Yes), and process 600 may include providing the software code line, the path, and the software code file location details to a code developer engine (block 624). For example, the device may provide the software code line, the path, and the software code file location details to a code developer engine, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has,"

"have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a device, requirement data identifying a requirement for modification of software code;
  processing, by the device, the requirement data, with a machine learning model, to identify one or more entities and one or more intents in the software code and to generate a query based on the one or more entities and the one or more intents;
  processing, by the device, the query, with a code locator model, to encode text of the query into high-dimensional vectors and to identify a semantic similarity between the high-dimensional vectors and code text provided in the software code,
    wherein the code locator model includes a universal sentence encoder that is trained with a two-deep averaging network encoder in parallel with a different drop rate, a composition function, and by determining an average of similarity confidence;
  processing, by the device, the query, the semantic similarity, and the code text, with a code developer model, to generate metadata;
  utilizing, by the device, the metadata to identify an identifier associated with the software code;
  determining, by the device, with the code developer model, and utilizing the identifier, a portion of the software code;
  modifying, by the device, the portion of the software code based on the query to generate modified software code; and
  performing, by the device, one or more actions based on the modified software code.

2. The method of claim 1, wherein receiving the requirement data comprises:
  receiving the requirement data via one of a textual input or a voice input; and
  performing, when the requirement data is received via the voice input, natural language processing on the voice input to generate textual data.

3. The method of claim 1, wherein processing the requirement data, with the machine learning model, to identify the one or more entities and the one or more intents in the software code and to generate the query comprises:
  generating a knowledge graph based on the requirement data;
  extracting the one or more entities from the knowledge graph;
  mapping the one or more entities with the one or more intents based on the knowledge graph; and
  generating the query based on mapping the one or more entities with the one or more intents.

4. The method of claim 1, wherein the machine learning model is a machine reasoning model.

5. The method of claim 1, wherein processing the requirement data, with the machine learning model, to identify the one or more entities and the one or more intents in the software code and to generate the query comprises:
  parsing the requirement data to generate parsed data;
  identifying the one or more entities and the one or more intents based on the parsed data; and
  generating the query based on identifying the one or more entities and the one or more intents.

6. The method of claim 1, wherein processing the query, with the code locator model, to encode the text of the query into the high-dimensional vectors and to identify the semantic similarity between the high-dimensional vectors and the code text provided in the software code comprises:
  classifying the text of the query based on the high-dimensional vectors to generate classified text;
  clustering the classified text to determine a similarity confidence between the classified text and the code text; and
  identifying the semantic similarity between the high-dimensional vectors and the code text based on clustering the classified text to determine the similarity confidence.

7. The method of claim 1, wherein receiving the requirement data comprises:
  receiving the requirement data via a chat bot.

8. A device, comprising:
  one or more memories; and
  one or more processors, communicatively coupled to the one or more memories, configured to:
    receive requirement data identifying a requirement for modification of software code;
    process the requirement data, with a machine reasoning model, to identify one or more entities and one or more intents in the software code and to generate a query based on the one or more entities and the one or more intents;
    process the query, with a code locator model, to encode text of the query into high-dimensional vectors and to identify a semantic similarity between the high-dimensional vectors and code text provided in the software code,
      wherein the code locator model includes a universal sentence encoder that is trained with a two-deep averaging network encoder in parallel with a different drop rate, a composition function, and by determining an average of similarity confidence;
    process the query, the semantic similarity, and the code text, with a code developer model, to generate metadata;
    utilize the metadata to identify an identifier associated with the software code;
    determine, with the code developer model and utilizing the identifier, a portion of the software code;
    modify the portion of the software code based on the query to generate modified software code; and
    perform one or more actions based on the modified software code.

9. The device of claim 8, wherein the semantic similarity between the high-dimensional vectors is determined based on cosine similarities between pairs of the high-dimensional vectors in inner product space.

10. The device of claim 8, wherein the one or more processors, when processing the query, the semantic similarity, and the code text, with the code developer model, to generate the metadata, are configured to:
  generate the metadata based on the one or more entities of the query and based on the semantic similarity.

11. The device of claim 8, wherein the one or more processors, when determining, with the code developer model and utilizing the identifier, the portion of the software code, are configured to:
  retrieve the portion of the software code based on the identifier; and modify the portion of the software code based on the one or more entities and the one or more intents of the query.

12. The device of claim 8, wherein the one or more processors, when performing the one or more actions based on the modified software code, are configured to one or more of:
cause the modified software code to be implemented in production;
provide the modified software code for display; or
receive feedback associated with implementing the modified software code and updating the modified software code based on the feedback.

13. The device of claim 8, wherein the one or more processors, when performing the one or more actions based on the modified software code, are configured to one or more of:
provide the modified software code to a software development and operations environment for testing;
generate and provide a recommendation for further modification of the software code based on the modified software code; or
retrain at least one of the machine reasoning model, the code locator model, or the code developer model based on the modified software code.

14. The device of claim 8, wherein the one or more processors, when performing the one or more actions based on the modified software code, are configured to:
cause the modified software code to be implemented in production;
receive feedback associated with implementing the modified software code in production; and
update the modified software code based on the feedback.

15. A non-transitory computer-readable medium storing a set of instructions, the set of instructions comprising:
one or more instructions that, when executed by one or more processors of a device, cause the device to:
receive requirement data identifying a requirement for modification of software code;
process the requirement data, with a machine learning model, to identify one or more entities and one or more intents in the software code and to generate a query based on the one or more entities and the one or more intents;
process the query, with a code locator model, to encode text of the query into high-dimensional vectors and to identify a semantic similarity between the high-dimensional vectors and code text provided in the software code,
wherein the code locator model includes a universal sentence encoder that is trained with a two-deep averaging network encoder in parallel with a different drop rate, a composition function, and by determining an average of similarity confidence;
process the query, the semantic similarity, and the code text, with a code developer model, to generate metadata;
utilize the metadata to identify an identifier associated with the software code;
determine, with the code developer model and utilizing the identifier, a portion of the software code;
modify the portion of the software code based on the query to generate modified software code; and
cause the modified software code to be implemented in production.

16. The non-transitory computer-readable medium of claim 15, wherein the one or more instructions, that cause the device to process the requirement data, with the machine learning model, to identify the one or more entities and the one or more intents in the software code and to generate the query, cause the device to:
generate a knowledge graph based on the requirement data;
extract the one or more entities from the knowledge graph;
map the one or more entities with the one or more intents based on the knowledge graph; and
generate the query based on mapping the one or more entities with the one or more intents.

17. The non-transitory computer-readable medium of claim 15, wherein the one or more instructions, that cause the device to process the requirement data, with the machine learning model, to identify the one or more entities and the one or more intents in the software code and to generate the query, cause the device to:
parse the requirement data to generate parsed data;
identify the one or more entities and the one or more intents based on the parsed data; and
generate the query based on identifying the one or more entities and the one or more intents.

18. The non-transitory computer-readable medium of claim 15, wherein the one or more instructions, that cause the device to process the query, with the code locator model, to encode the text of the query into the high-dimensional vectors and to identify the semantic similarity between the high-dimensional vectors and the code text provided in the software code, cause the device to:
classify the text of the query based on the high-dimensional vectors to generate classified text;
cluster the classified text to determine a similarity confidence between the classified text and the code text; and
identify the semantic similarity between the high-dimensional vectors and the code text based on clustering the classified text to determine the similarity confidence.

19. The non-transitory computer-readable medium of claim 15, wherein the one or more instructions, that cause the device to process the query, the semantic similarity, and the code text, with the code developer model, to generate the metadata, cause the device to:
generate the metadata based on the one or more entities of the query and based on the semantic similarity.

20. The non-transitory computer-readable medium of claim 15, wherein the one or more instructions, that cause the device to determine, with the code developer model and utilizing the identifier, the portion of the software code, cause the device to:
retrieve the portion of the software code based on the identifier; and
modify the portion of the software code based on the one or more entities and the one or more intents of the query.

* * * * *